(12) United States Patent
D'Ambruoso

(10) Patent No.: US 10,184,347 B1
(45) Date of Patent: Jan. 22, 2019

(54) NON-CONTACT SEAL WITH RESILIENT BIASING ELEMENT(S)

(71) Applicant: United Technologies Corporation, Farmington, CT (US)

(72) Inventor: Tara L. D'Ambruoso, Oxford, CT (US)

(73) Assignee: United Technologies Corporation, Farmington, CT (US)

( * ) Notice: Subject to any disclaimer, the term of this patent is extended or adjusted under 35 U.S.C. 154(b) by 0 days.

(21) Appl. No.: 15/653,020

(22) Filed: Jul. 18, 2017

(51) Int. Cl.
*F16J 15/44* (2006.01)
*F01D 11/02* (2006.01)
*F02C 7/28* (2006.01)
*F16J 15/447* (2006.01)

(52) U.S. Cl.
CPC ............ *F01D 11/025* (2013.01); *F01D 11/02* (2013.01); *F02C 7/28* (2013.01); *F05D 2220/32* (2013.01); *F05D 2240/10* (2013.01); *F05D 2240/20* (2013.01); *F05D 2260/52* (2013.01); *F16J 15/447* (2013.01)

(58) Field of Classification Search
CPC ...... F16J 15/3288; F16J 15/442; F16J 15/447; F01D 11/02; F01D 11/025; F01D 11/08; F05D 2240/55; F05D 2240/56; F02C 7/28
See application file for complete search history.

(56) References Cited

U.S. PATENT DOCUMENTS

| | | | |
|---|---|---|---|
| 6,428,009 B2 | 8/2002 | Justak | |
| 7,182,345 B2 | 2/2007 | Justak | |
| 7,410,173 B2 | 8/2008 | Justak | |
| 7,896,352 B2 | 3/2011 | Justak | |
| 8,002,285 B2 | 8/2011 | Justak | |
| 8,172,232 B2 | 5/2012 | Justak | |
| 8,641,045 B2* | 2/2014 | Justak | F16J 15/442 277/412 |
| 8,740,225 B2* | 6/2014 | Patterson | F01D 11/02 277/413 |
| 8,820,752 B2 | 9/2014 | Garrison et al. | |
| 8,919,781 B2* | 12/2014 | Justak | F01D 11/025 277/411 |
| 9,115,810 B2 | 8/2015 | Bidkar et al. | |
| 10,030,531 B2* | 7/2018 | Peters | F03B 3/12 |

(Continued)

OTHER PUBLICATIONS

Extended European Search Report for EP Appln. No. 18173373.4 dated Oct. 4, 2018.

*Primary Examiner* — Nicholas L Foster
(74) *Attorney, Agent, or Firm* — O'Shea Getz P.C.

(57) ABSTRACT

A seal device includes a plurality of seal shoes, a seal base, a plurality of spring elements and a resilient biasing element. The seal shoes are arranged around an axis. The seal base circumscribes the seal shoes. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam connects the first mount to the second mount. The resilient biasing element is radially between and engaged with first and second components of the seal device, where the first component is configured as or otherwise includes the first mount or the second mount.

17 Claims, 8 Drawing Sheets

(56) References Cited

U.S. PATENT DOCUMENTS

| | | | |
|---|---|---|---|
| 2007/0120327 A1* | 5/2007 | Justak | F01D 11/00 277/355 |
| 2008/0100000 A1* | 5/2008 | Justak | F16J 15/442 277/355 |
| 2008/0246223 A1* | 10/2008 | Justak | F01D 11/02 277/411 |
| 2008/0265513 A1* | 10/2008 | Justak | F01D 11/025 277/301 |
| 2011/0121519 A1* | 5/2011 | Justak | F01D 11/025 277/412 |
| 2011/0309585 A1 | 12/2011 | Uehara et al. | |
| 2013/0234399 A1* | 9/2013 | Justak | F01D 11/025 277/411 |
| 2015/0285152 A1* | 10/2015 | Hayford | F02C 7/28 415/171.1 |
| 2015/0322816 A1* | 11/2015 | Schmitz | F01D 1/04 60/796 |
| 2016/0069269 A1* | 3/2016 | Hyland | F01D 19/00 415/1 |
| 2016/0102570 A1 | 4/2016 | Wilson et al. | |
| 2016/0108750 A1* | 4/2016 | Wilson | F01D 11/00 277/411 |
| 2016/0130963 A1* | 5/2016 | Wilson | F01D 11/001 60/805 |
| 2017/0009596 A1* | 1/2017 | Schwarz | B64D 27/10 |
| 2017/0051621 A1* | 2/2017 | Ackermann | F01D 5/087 |
| 2017/0051631 A1* | 2/2017 | Ackermann | F01D 5/02 |
| 2017/0051751 A1* | 2/2017 | Ackermann | F01D 5/06 |
| 2017/0211402 A1* | 7/2017 | Peters | F01D 5/02 |
| 2017/0211406 A1* | 7/2017 | Peters | F03B 3/12 |
| 2017/0226883 A1* | 8/2017 | Peters | F01D 11/025 |
| 2017/0248236 A1* | 8/2017 | Simpson | F16J 15/447 |
| 2018/0058240 A1* | 3/2018 | Chuong | F01D 5/02 |

* cited by examiner

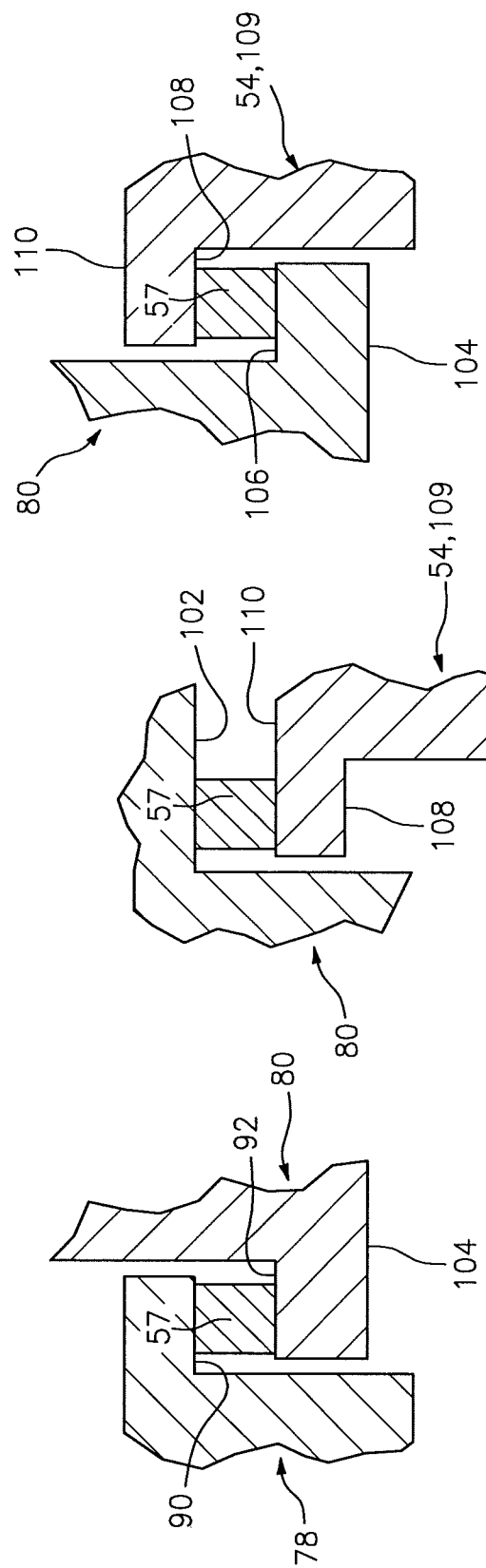

US 10,184,347 B1

NON-CONTACT SEAL WITH RESILIENT BIASING ELEMENT(S)

This invention was made with government support under Contract No. FA8626-16-C-2139 awarded by the United States Air Force. The government may have certain rights in the invention.

BACKGROUND

1. Technical Field

This disclosure relates generally to rotational equipment and, more particularly, to a non-contact seal assembly for rotational equipment.

2. Background Information

Rotational equipment such as a gas turbine engine typically includes a seal assembly for sealing an annular gap between a rotor and a stationary structure. Various types and configurations of seal assemblies are known in the art. While these known seal assemblies have various advantages, there is still room in the art for improvement.

SUMMARY OF THE DISCLOSURE

According to an aspect of the present disclosure, an assembly is provided for rotational equipment. This assembly includes a seal device. The seal device includes a plurality of seal shoes, a seal base, a plurality of spring elements and a resilient biasing element. The seal shoes are arranged around an axis in an annular array. The seal base circumscribes the annular array of the seal shoes. Each of the spring elements is radially between and connects a respective one of the seal shoes and the seal base. A first of the spring elements includes a first mount, a second mount and a spring beam. The first mount is connected to a first of the seal shoes. The second mount is connected to the seal base. The spring beam connects the first mount to the second mount. The resilient biasing element is radially between and engaged with first and second components of the seal device, where the first component is configured as or otherwise includes the first mount or the second mount.

According to another aspect of the present disclosure, another assembly is provided for rotational equipment. This assembly includes a seal device. The seal device includes a plurality of seal shoes, a seal base, a plurality of spring elements and a spring. The seal shoes are arranged around an axis. The seal base extends circumferentially around the seal shoes and the spring elements. Each of the spring elements connects a respective one of the seal shoes to the seal base. A first of the spring elements includes a first mount, a second mount and a plurality of spring beams. The first mount is connected to a first of the seal shoes. The second mount is connected to the seal base. Each of the spring beams connects the first mount to the second mount. The spring is abutted against first and second components of the seal device, where the first component is configured as or otherwise includes the first mount or the second mount.

According to still another aspect of the present disclosure, another assembly is provided for rotational equipment. This assembly includes a seal device. The seal device includes a plurality of seal shoes, a seal base, a plurality of spring elements and a spring. The seal shoes are arranged around an axis. The seal base extends circumferentially around the seal shoes and the spring elements. Each of the spring elements connects a respective one of the seal shoes to the seal base. A first of the spring elements includes a first mount, a second mount and a plurality of spring beams. The first mount is connected to a first of the seal shoes. The second mount is connected to the seal base. Each of the spring beams connects the first mount to the second mount. The spring is abutted against first and second components of the seal device. The spring is configured to increase a stiffness of the first of the spring elements. The first component is configured as or otherwise includes the first mount or the second mount.

The resilient biasing element may be configured to increase a stiffness of the first of the spring elements.

The resilient biasing element may be configured to bias a first portion of the first of the seal shoes radially away from the seal base and a second portion of the first of the seal shoes radially towards the seal base.

The resilient biasing element may be configured as or otherwise include a spring.

The resilient biasing element/the spring may be configured as or otherwise include a coil spring.

The first component may be configured as or otherwise include the first mount. The second component may be configured as or otherwise include the seal base.

The first component may be configured as or otherwise include the first mount. The second component may be configured as or otherwise include a mount of a second of the spring elements that is circumferentially adjacent to the first of the spring elements.

The first mount may be configured as or otherwise include an inner surface. The mount of the second of the spring elements may be configured as or otherwise include an outer surface radially below the inner surface. The resilient biasing element may be radially between and engage the inner surface and the outer surface.

The mount of the second of the spring elements may be configured as or otherwise include a second mount. The second of the spring elements may also include a first mount and a spring beam. The first mount of the second of the spring elements may be connected to a second of the seal shoes. The second mount of the second of the spring elements may be connected to the seal base. The spring beam of the second of the spring elements may connect the first mount of the second of the spring elements to the second mount of the second of the spring elements.

The first component may be configured as or otherwise include the second mount. The second component may be configured as or otherwise include the first of the seal shoes.

The second mount may be configured as or otherwise include an inner surface. The first of the seal shoes may be configured as or otherwise include an outer surface radially below the inner surface. The resilient biasing element may be radially between and engage the inner surface and the outer surface.

The first of the seal shoes may be configured as or otherwise include an inner surface. The second mount may be configured as or otherwise include an outer surface radially below the inner surface. The resilient biasing element may be radially between and engage the inner surface and the outer surface.

The first component may be configured as or otherwise include the first mount. The seal device may also include a second resilient biasing element engaged with the second mount.

The seal device may also include a second resilient biasing element engaged with the first component.

The first of the spring elements may also include a second spring beam connecting the first mount to the second mount.

The assembly may also include a ring structure and a secondary seal device. The ring structure may be axially engaged with the seal base. The secondary seal device may be mounted with the ring structure. The secondary seal device may be configured to substantially seal an annular gap between the ring structure and the annular array of the seal shoes.

The assembly may also include a stationary structure, a rotor structure and a non-contact seal assembly. The non-contact seal assembly may be configured as or otherwise include the seal device. The seal assembly may be configured to substantially seal an annular gap between the stationary structure and the rotor structure. The seal shoes may circumscribe and sealingly mate with the rotor structure. The seal base may be mounted to and radially within the stationary structure.

The foregoing features and the operation of the invention will become more apparent in light of the following description and the accompanying drawings.

BRIEF DESCRIPTION OF THE DRAWINGS

FIGS. 7-9 are schematic illustrations of other portions of a primary seal device configured with resilient biasing elements.

DETAILED DESCRIPTION

Figure 1:
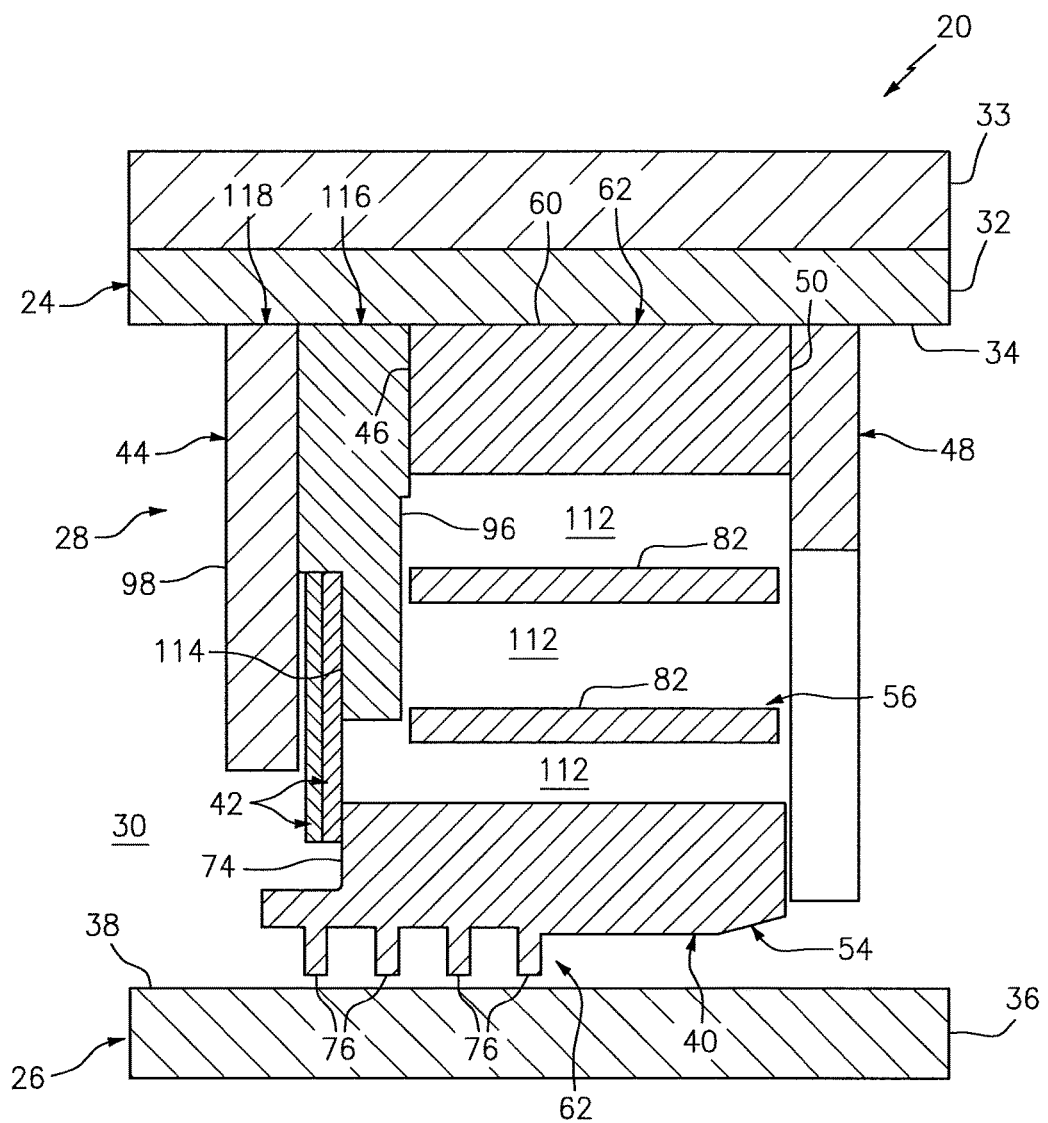
FIG. 1 is a partial side sectional illustration of an assembly for rotational equipment.

FIG. 1 illustrates an assembly 20 for rotational equipment with an axis 22 of rotation; i.e., a rotational axis. An example of such rotational equipment is a gas turbine engine for an aircraft propulsion system, an exemplary embodiment of which is described below in further detail. However, the assembly 20 of the present disclosure is not limited to such an aircraft or gas turbine engine application. The assembly 20, for example, may alternatively be configured with rotational equipment such as an industrial gas turbine engine, a wind turbine, a water turbine or any other apparatus in which a seal is provided between a stationary structure and a rotor.

The assembly 20 of FIG. 1 includes a stationary structure 24, a rotor structure 26 and a non-contact seal assembly 28. The seal assembly 28 is mounted with the stationary structure 24 and configured to substantially seal an annular gap 30 between the stationary structure 24 and the rotor structure 26 as described below in further detail.

The stationary structure 24 includes a seal carrier 32. This seal carrier 32 may be a discrete, unitary annular body and removably attached to another component 33 of the stationary structure 24. Alternatively, the seal carrier 32 may be configured with another component/portion of the stationary structure 24; e.g., the components 32 and 33 may be integrally formed. The seal carrier 32 has an inner radial seal carrier surface 34. This seal carrier surface 34 may be substantially cylindrical, and extends circumferentially around and faces towards the axis 22. The seal carrier surface 34 at least partially forms a bore in the stationary structure 24. This bore is sized to receive the seal assembly, which may be fixedly attached to the seal carrier 32 by, for example, a press fit connection between the seal assembly and the seal carrier surface 34. The seal assembly, of course, may also or alternatively be fixedly attached to the seal carrier 32 using one or more other techniques/devices.

The rotor structure 26 includes a seal land 36. This seal land 36 may be a discrete, unitary annular body. Alternatively, the seal land 36 may be configured with another component/portion of the rotor structure 26. The seal land 36 has an outer radial seal land surface 38. This seal land surface 38 may be substantially cylindrical, and extends circumferentially around and faces away from the axis 22. The seal land surface 38 is disposed to face towards and is axially aligned with the seal carrier surface 34. While FIG. 1 illustrates the seal land surface 38 and the seal carrier surface 34 with approximately equal axial lengths along the axis 22, the seal land surface 38 may alternatively be longer or shorter than the seal carrier surface 34 in other embodiments.

The seal assembly 28 includes a primary seal device 40 and one or more secondary seal devices 42. The seal assembly 28 also includes one or more additional components for positioning, supporting and/or mounting one or more of the seal devices with the stationary structure 24. The seal assembly 28 of FIG. 1, for example, includes a first ring structure 44 configured for positioning, supporting and/or mounting the secondary seal devices 42 relative to the primary seal device 40. This first ring structure 44 may also be configured for axially positioning and/or supporting a first end surface 46 of the primary seal device 40 relative to the stationary structure 24. The seal assembly 28 of FIG. 1 also includes a second ring structure 48 (e.g., a scalloped support ring/plate) configured for axially positioning and/or supporting a second end surface 50 of the primary seal device 40 relative to the stationary structure 24. However, the second ring structure 48 may be omitted where, for example, the second end surface 50 of the primary seal device 40 is abutted against another component/portion of the stationary structure 24 (e.g., an annular or castellated shoulder) or otherwise axially positioned/secured with the stationary structure 24.

Figure 2:
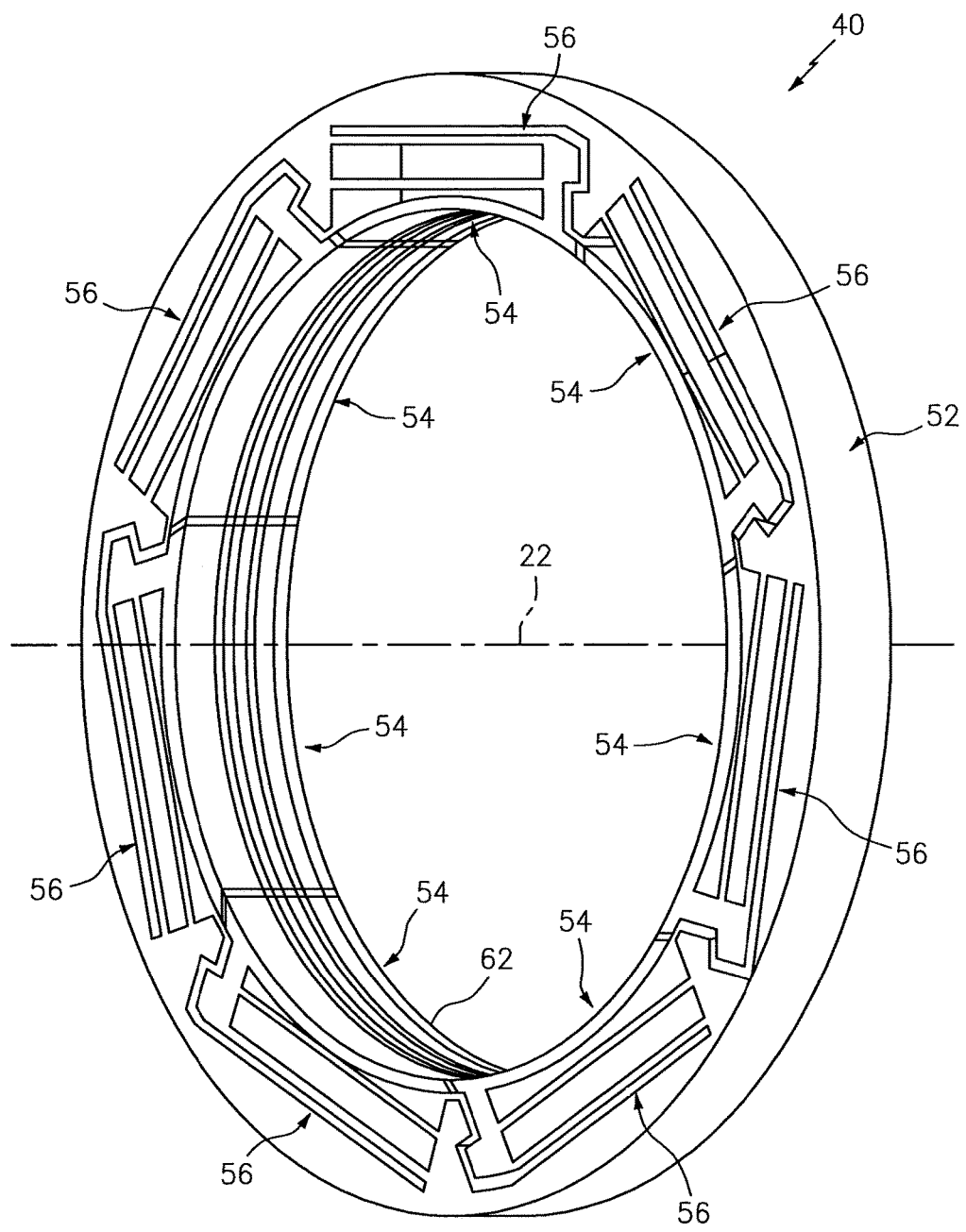
FIG. 2 is a perspective illustration of a primary seal device of a non-contact seal assembly.

Referring to FIG. 2, the primary seal device 40 is configured as an annular non-contact seal device and, more particularly, a hydrostatic non-contact seal device. An example of such a hydrostatic non-contact seal device is a HALO™ type seal; however, the primary seal device 40 of the present disclosure is not limited to the foregoing exemplary hydrostatic non-contact seal device.

Figure 3:
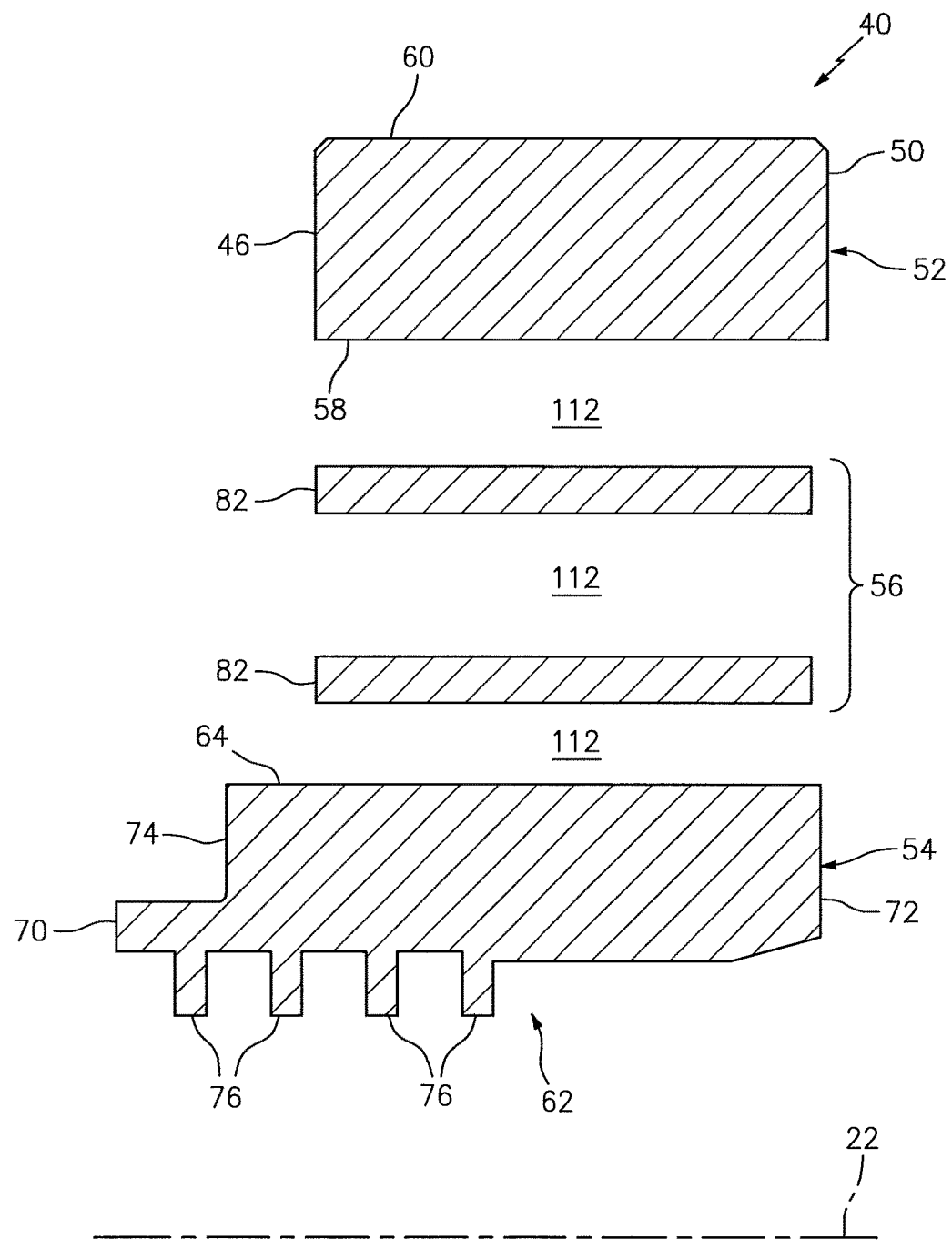
FIG. 3 is a partial side sectional illustration of the primary seal device.
Figure 4:
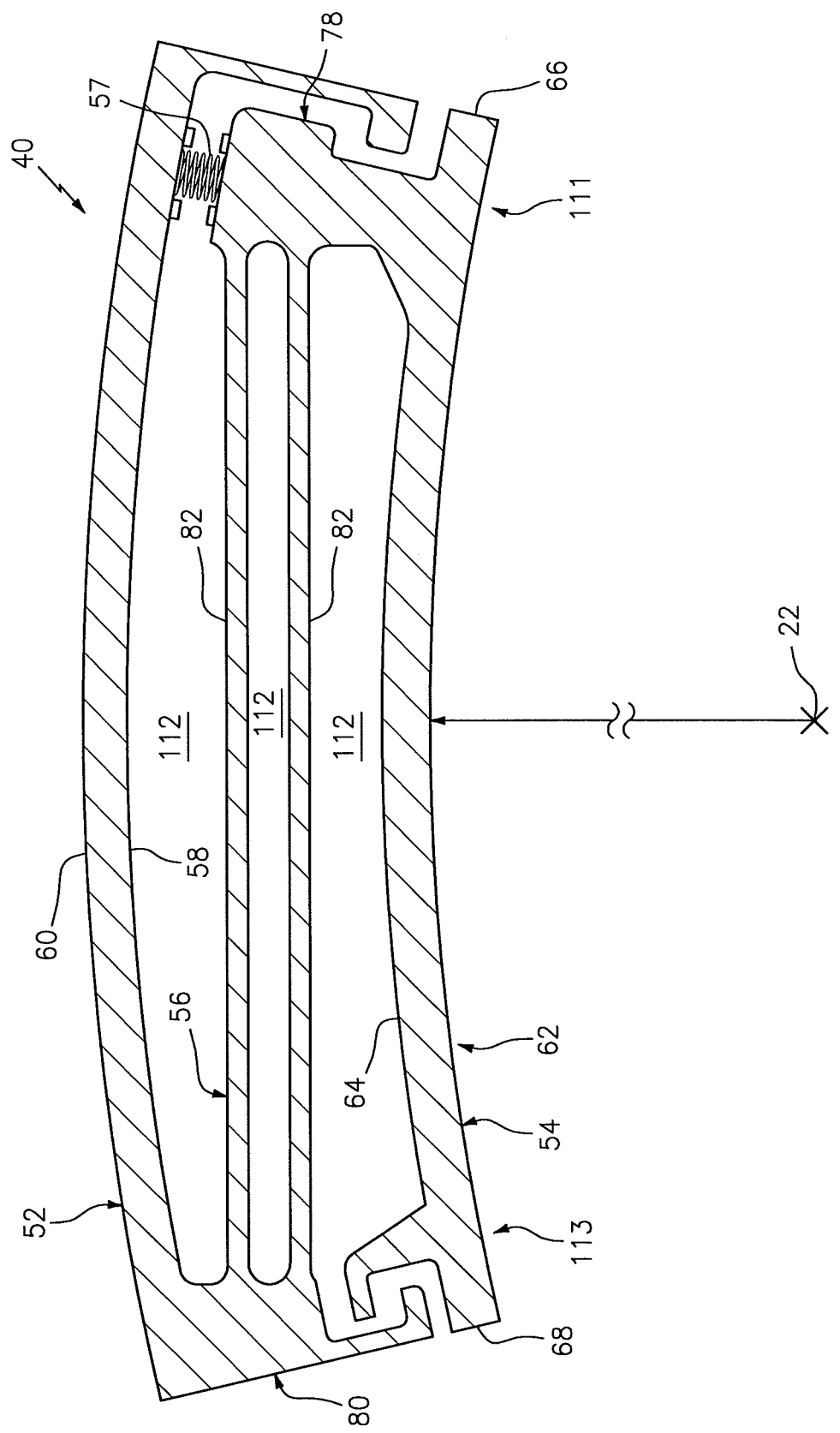
FIG. 4 is an end illustration of a section of the primary seal device.

Referring to FIGS. 3 and 4, the primary seal device 40 includes a seal base 52, a plurality of seal shoes 54, a plurality of spring elements 56. The primary seal device 40 also includes a plurality of resilient biasing elements 57 configured to increase stiffness between the seal shoes 54 and the seal base 52 as described below in further detail.

The seal base 52 is configured as an annular full hoop body (see FIG. 2), which extends circumferentially around the axis 22. The seal base 52 is configured to circumscribe and support the seal shoes 54 as well as the spring elements 56. The seal base 52 extends axially along the axis 22 between and forms the first end surface 46 and the second end surface 50. The seal base 52 extends radially between an inner radial base side 58 and an outer radial base side 60. The outer radial base side 60 radially engages (e.g., is press fit against) the stationary structure 24 and, more particularly, the seal carrier surface 34 (see FIG. 1).

Referring to FIG. 2, the seal shoes 54 are configured as arcuate bodies and arranged circumferentially about the axis 22 in an annular array. This annular array of the seal shoes 54 extends circumferentially around the axis 22, thereby forming an inner bore at an inner radial side 62 of the primary seal device 40. As best seen in FIG. 1, the inner bore is sized to receive the seal land 36, where the rotor structure 26 projects axially through (or into) the inner bore formed by the seal shoes 54.

Referring to FIG. 4, each of the seal shoes 54 extends radially from the inner radial side 62 of the primary seal device 40 to an outer radial surface 64 of that seal shoe 54. Each of the seal shoes 54 extends circumferentially around the axis 22 between opposing first and second circumferential sides 66 and 68 of that seal shoe 54.

Referring to FIG. 3, each of the seal shoes 54 extends axially along the axis 22 between a first shoe end 70 and a second shoe end 72. The first shoe end 70 may be axially offset from and project axially away from the first end surface 46. The second shoe end 72 may be axially aligned with the second end surface 50. The seal shoes 54 of the present disclosure, however, are not limited to such exemplary relationships.

Each of the seal shoes 54 includes an arcuate end surface generally at (e.g., on, adjacent or proximate) the first shoe end 70. In the array, these arcuate end surfaces collectively form a generally annular (but circumferentially segmented) end surface 74 configured for sealingly engaging with the secondary seal devices 42; see FIG. 1. The seal shoes 54 of the present disclosure, however, are not limited to the foregoing exemplary configuration.

Each of the seal shoes 54 includes one or more arcuate protrusions, which collectively form one or more (e.g., a plurality of axially spaced) generally annular (e.g., circumferentially segmented) ribs 76 at the inner radial side 62. Distal inner radial ends of one or more of these ribs 76 are configured to be arranged in close proximity with (but not touch) and thereby sealingly mate with the seal land surface 38 in a non-contact manner (see FIG. 1), where the rotor structure 26 projects axially through (or into) the inner bore formed by the seal shoes 54. In the embodiment of FIG. 3, each of the ribs 76 has the same radial height. In other embodiments, however, one or more of the ribs 76 may have a different radial height than at least another one of the ribs 76.

Referring to FIG. 2, the spring elements 56 are arranged circumferentially about the axis 22 in an annular array. Referring again to FIGS. 3 and 4, the spring elements 56 are also arranged radially between the seal shoes 54 and the seal base 52. Each of the spring elements 56 is configured to moveably and resiliently connect a respective one of the seal shoes 54 to the seal base 52.

Figure 5:
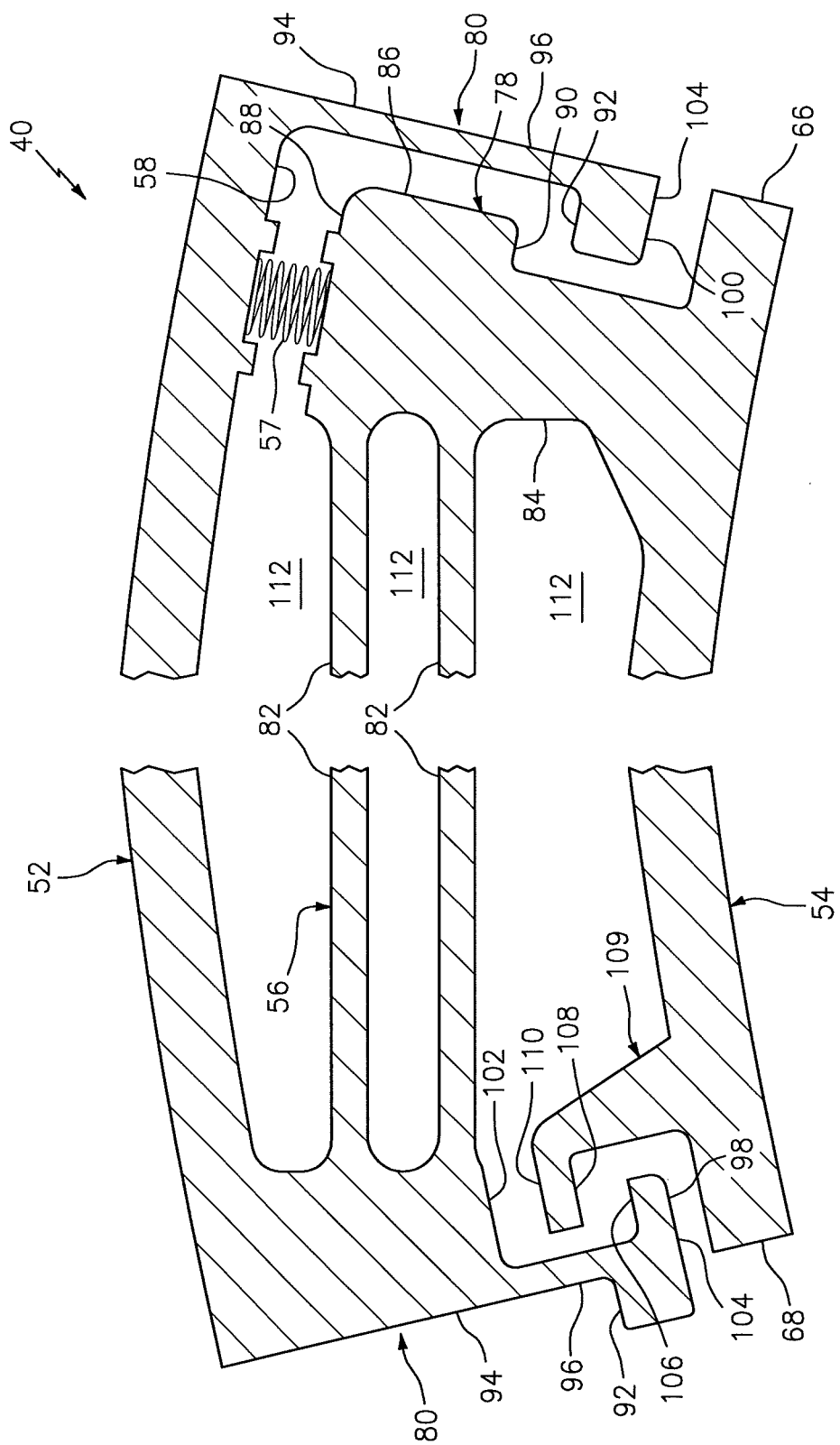
FIG. 5 is a segmented end illustration of the primary seal device section of FIG. 4.

The spring element 56 of FIG. 4 includes first and second mounts 78 and 80 (e.g., radial fingers/projections) and one or more spring beams 82. Referring to FIG. 5, the first mount 78 is connected to a respective one of the seal shoes 54 at (e.g., on, adjacent or proximate) the first circumferential side 66, where the opposing second circumferential side 68 of that seal shoe 54 is free floating. The first mount 78 of FIG. 5 includes a first mount base 84 and a first mount lip 86. The first mount base 84 projects radially out from the respective seal shoe 54 to a distal radial outer surface 88 of the first mount 78. The first mount base 84 is disposed circumferentially between the spring beams 82 and the first mount lip 86. The first mount lip 86 projects laterally (e.g., circumferentially or tangentially) out from the first mount base 84. The first mount lip 86 extends radially inward from the outer surface 88 to a radial inner surface 90 of the first mount 78.

The outer surface 88 and the inner surface 90 are configured as stops for the respective seal shoe 54. More particularly, each surface 88, 90 is configured to restrict (e.g., limit) radial movement of the respective seal shoe 54 proximate the first mount 78. For example, interaction (e.g., contact) between the outer surface 88 and another feature such as the resilient biasing element 57 (or alternatively the surface of the seal base 52) will restrict how far the respective seal shoe 54 can move radially outward. Similarly, interaction (e.g., contact) between the inner surface 90 and another feature such as a radially outer surface 92 of the second mount 80 of an adjacent spring element 56 will restrict how far the respective seal shoe 54 can move radially inward.

The second mount 80 is connected to the seal base 52, and is generally circumferentially aligned with or near the second circumferential side 68. The second mount 80 therefore is disposed a circumferential distance from the first mount 78.

The second mount 80 of FIG. 5 includes a second mount base 94, a second mount flange 96 and one or more second mount lips 98 and 100. The second mount base 94 projects radially inward from the seal base 52 to a radial inner surface 102. The second mount flange 96 is laterally adjacent the inner surface 102. The second mount flange 96 projects radially inwards from the seal base 52 to a distal radial inner surface 104 of the second mount 80. The second mount flange 96 is disposed laterally between the second mount lips 98 and 100. The second mount lip 98 projects laterally out from the second mount flange 96. The second mount lip 98 extends radially outward from the inner surface 104 to a radial outer surface 106 of the second mount 80. The second mount lip 100 projects laterally out from the second mount flange 96. The second mount lip 100 extends radially outward from the inner surface 104 to the outer surface 92 of the second mount 80.

The outer surface 106 and the inner surface 102 are configured as stops for the respective seal shoe 54. More particularly, each surface 106, 102 is configured to restrict (e.g., limit) radial movement of the respective seal shoe 54 proximate the second mount 80. For example, interaction (e.g., contact) between the outer surface 106 and another feature such as a radial inner surface 108 of a lipped flange 109 of the respective seal shoe 54 will restrict how far the respective seal shoe 54 can move radially inward. Similarly, interaction (e.g., contact) between the inner surface 102 and another feature such as a radial outer surface 110 of the lipped flange 109 will restrict how far the respective seal shoe 54 can move radially outward.

The spring beams 82 are configured as resilient biasing members of the primary seal device 40. The spring beams 82 of FIG. 4, for example, are generally configured as cantilevered-leaf springs. These spring beams 82 are radially stacked and spaced apart with one another so as to form a four bar linkage with the first mount 78 and the second mount 80. More particularly, each of the spring beams 82 is connected to the first mount 78 and the second mount 80. Each of the spring beams 82 extends longitudinally (e.g., in a generally circumferential direction relative to the axis 22) between and to the first mount 78 and the second mount 80. The spring beams 82 of FIG. 4 may thereby laterally overlap a major circumferential portion (e.g., ~65-95%) of the respective seal shoe 54.

The spring beams 82 are configured to provide the respective spring element 56 with a certain spring stiffness. This spring stiffness is selected in order to reduce internal stress within the spring beams 82 while also providing the respective spring element 56 with a relatively high natural frequency. However, reducing internal spring beam stress may lower the natural frequency of the respective spring element 56. Therefore, in order to enable relatively low spring beam stress, the resilient biasing elements 57 are provided.

Each resilient biasing element 57 is configured to enhance (e.g., increase) the spring stiffness of the respective spring element 56 by biasing a first portion 111 of the respective seal shoe 54 radially inward and away from the seal base 52, where the first portion 111 is generally circumferentially aligned with the element 57. This resilient biasing element 57 also biases a second portion 113 of the respective seal shoe 54 radially outward and towards the seal base 52, where the second portion 113 is circumferentially offset from the element 57. Each resilient biasing element 57 is also configured to provide support for the first circumferential side 66 of that seal shoe 54. As a result, one or more of the spring beams 82 may be configured with a lower natural frequency in order to lower the internal stresses thereof since the additional spring stiffness provided by the resilient biasing element 57 may effectively make up for s stress-reduction change to the spring beams 82. Inclusion of the resilient biasing elements 57 may also enable formation of the spring beams 82 from less stiff materials, which may decrease primary seal device 40 manufacturing costs.

Figure 6:
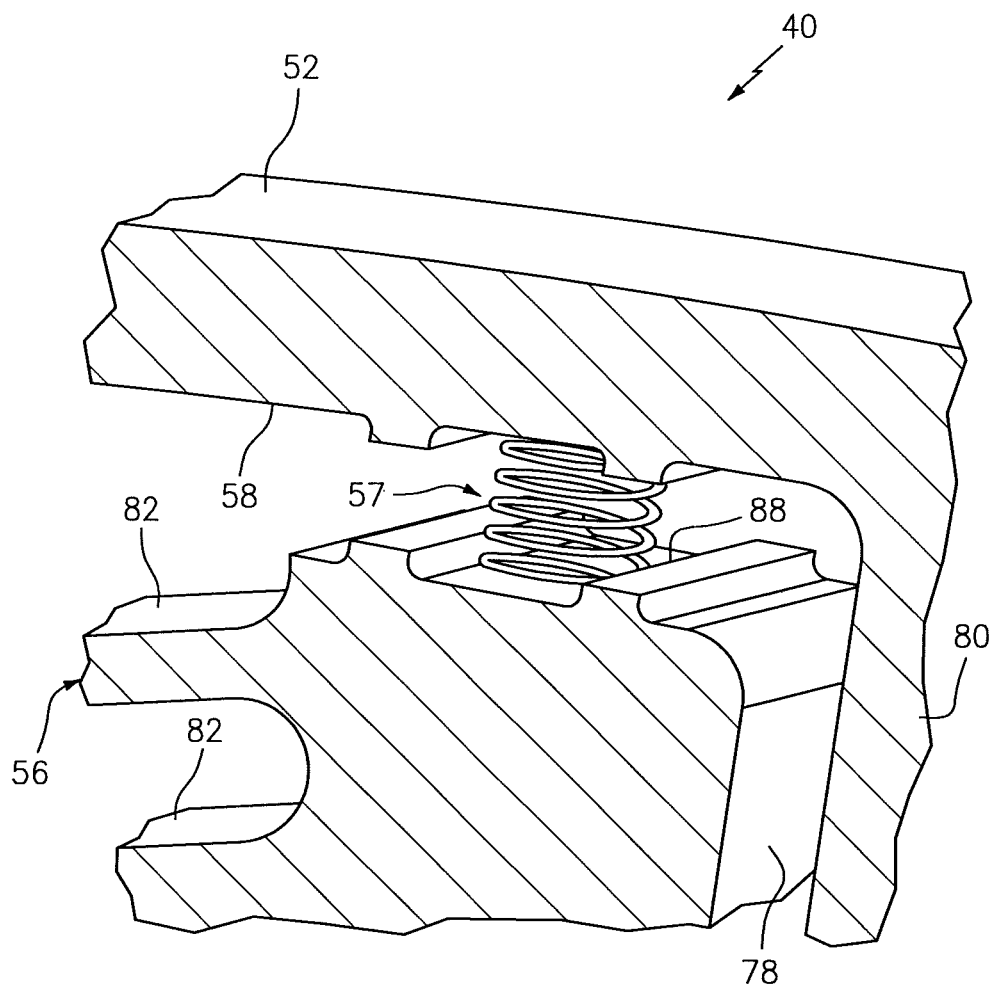
FIG. 6 is a perspective illustration of a portion of the primary seal device section of FIG. 4.

Each of the resilient biasing elements 57 may be configured as a spring. For example, the resilient biasing element 57 of FIG. 6 is configured as a coil spring. However, in other embodiments, the resilient biasing element 57 may be configured as another type of spring (e.g., a leaf spring) or another type of resilient biasing device.

The resilient biasing element 57 of FIGS. 5 and 6 is disposed radially between the first mount 78 and the seal base 52. More particularly, the resilient biasing element 57 extends radially between and radially engages (e.g., contacts, is abutted against) the outer surface 88 and the surface 58 of the seal base 52. However, in other embodiments, the resilient biasing element 57 may be arranged elsewhere with the primary seal device 40. For example, referring to FIG. 7, the resilient biasing element 57 may be disposed radially between and engage the surfaces 90 and 92. In another example, referring to FIG. 8, the resilient biasing element 57 may be disposed radially between and engage the surfaces 102 and 110. In still another example, referring to FIG. 9, the resilient biasing element 57 may be disposed radially between and engage the surfaces 106 and 108. Of course, in further embodiments, the primary seal device 40 may include one or more additional sets of the resilient biasing elements 57 such that an element 57 can be arranged at all (or some combination) of the locations shown in FIGS. 6-9 and/or other locations.

Referring again to FIG. 1, during operation of the primary seal device 40, rotation of the rotor structure 26 may develop aerodynamic forces and apply a fluid pressure to the seal shoes 54 causing each seal shoe 54 to respectively move radially relative to the seal land surface 38. The fluid velocity may increase as a gap between a respective seal shoe 54 and the seal land surface 38 increases, thus reducing pressure in the gap and drawing the seal shoe 54 radially inwardly toward the seal land surface 38. As the gap closes, the velocity may decrease and the pressure may increase within the gap, thus, forcing the seal shoe 54 radially outwardly from the seal land surface 38. The respective spring element 56 may deflect and move with the seal shoe 54 to enable provision of a primary seal of the gap between the seal land surface 38 and ribs 76 within predetermined design tolerances.

While the primary seal device 40 described above is operable to generally seal the annular gap 30 between the stationary structure 24 and the rotor structure 26, fluid (e.g., gas) may still flow axially through passages 112 defined by the radial air gaps between the elements 52, 54 and 82. The secondary seal devices 42 therefore are provided to seal off these passages 112 and, thereby, further and more completely seal the annular gap 30.

Each of the secondary seal devices 42 may be configured as a ring seal element such as, but not limited to, a split ring. Alternatively, one or more of the secondary seal devices 42 may be configured as a full hoop body ring, an annular brush seal or any other suitable ring-type seal.

The secondary seal devices 42 of FIG. 1 are arranged together in an axial stack. In this stack, each of the secondary seal devices 42 axially engages (e.g., contacts) another adjacent one of the secondary seal devices 42. The stack of the secondary seal devices 42 is arranged with the first ring structure 44, which positions and mounts the secondary seal devices 42 with the stationary structure 24 adjacent the primary seal device 40. In this arrangement, the stack of the secondary seal devices 42 is operable to axially engage and form a seal between the end surface 74 of the array of the seal shoes 54 and an annular surface 114 of the first ring structure 44. These surfaces 74 and 114 are axially aligned with one another, which enables the stack of the secondary seal devices 42 to slide radially against, but maintain sealingly engagement with, the end surface 74 as the seal shoes 54 move radially relative to the seal land surface 38 as described above.

The first ring structure 44 may include a secondary seal device support ring 116 and a retention ring 118. The support ring 116 is configured with an annular full hoop body, which extends circumferentially around the axis 22. The support ring 116 includes the annular surface, and is disposed axially adjacent and engaged with the seal base 52.

The retention ring 118 is configured with an annular full hoop body, which extends circumferentially around the axis 22. The retention ring 118 is disposed axially adjacent and engaged with the support ring 116, thereby capturing the stack of the secondary seal devices 42 within an annular channel formed between the rings 116 and 118. The stack of the secondary seal devices 42, of course, may also or alternatively be attached to one of the rings 116, 118 by, for example, a press fit connection and/or otherwise.

Figure 10:
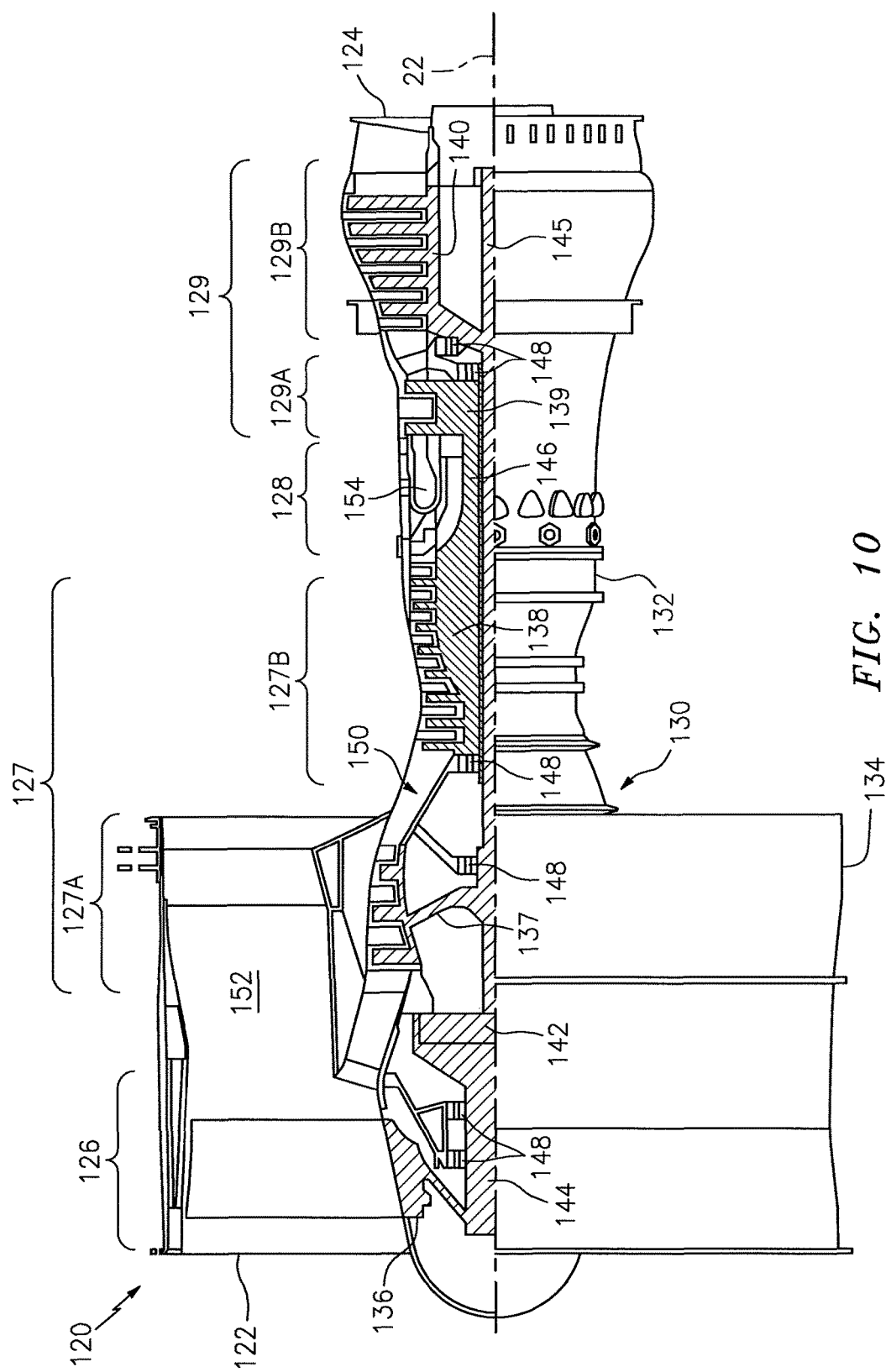
FIG. 10 is a side cutaway illustration of a geared gas turbine engine.

As described above, the assembly 20 of the present disclosure may be configured with various different types and configurations of rotational equipment. FIG. 10 illustrates one such type and configuration of the rotational equipment—a geared turbofan gas turbine engine 120. Such a turbine engine includes various stationary structures (e.g., bearing supports, hubs, cases, etc.) as well as various rotors (e.g., rotor disks, shafts, shaft assemblies, etc.) as described below, where the stationary structure 24 and the rotor structure 26 can respectively be configured as anyone of the foregoing structures in the turbine engine 120 of FIG. 10, or other structures not mentioned herein.

The turbine engine 120 of FIG. 10 extends along an axis (e.g., the axis 22 or rotation) between an upstream airflow inlet 122 and a downstream airflow exhaust 124. The turbine engine 120 includes a fan section 126, a compressor section 127, a combustor section 128 and a turbine section 129. The compressor section 127 includes a low pressure compressor (LPC) section 127A and a high pressure compressor (HPC) section 127B. The turbine section 129 includes a high pressure turbine (HPT) section 129A and a low pressure turbine (LPT) section 129B.

The engine sections 126-129 are arranged sequentially along the axis 22 within an engine housing 130. This housing 130 includes an inner case 132 (e.g., a core case) and an outer case 134 (e.g., a fan case). The inner case 132 may house one or more of the engine sections 127-129; e.g., an engine core. The outer case 134 may house at least the fan section 126.

Each of the engine sections 126, 127A, 127B, 129A and 129B includes a respective rotor 136-140. Each of these rotors 136-140 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

The fan rotor 136 is connected to a gear train 142, for example, through a fan shaft 144. The gear train 142 and the LPC rotor 137 are connected to and driven by the LPT rotor 140 through a low speed shaft 145. The HPC rotor 138 is connected to and driven by the HPT rotor 139 through a high speed shaft 146. The shafts 144-146 are rotatably supported by a plurality of bearings 148. Each of these bearings 148 is connected to the engine housing 130 by at least one stationary structure 24 such as, for example, an annular support strut.

During operation, air enters the turbine engine 120 through the airflow inlet 122. This air is directed through the fan section 126 and into a core gas path 150 and a bypass gas path 152. The core gas path 150 extends sequentially through the engine sections 127-129; e.g., an engine core. The air within the core gas path 150 may be referred to as "core air". The bypass gas path 152 extends through a bypass duct, which bypasses the engine core. The air within the bypass gas path 152 may be referred to as "bypass air".

The core air is compressed by the compressor rotors 137 and 138 and directed into a combustion chamber 154 of a combustor in the combustor section 128. Fuel is injected into the combustion chamber 154 and mixed with the compressed core air to provide a fuel-air mixture. This fuel air mixture is ignited and combustion products thereof flow through and sequentially cause the turbine rotors 139 and 140 to rotate. The rotation of the turbine rotors 139 and 140 respectively drive rotation of the compressor rotors 138 and 137 and, thus, compression of the air received from a core airflow inlet. The rotation of the turbine rotor 140 also drives rotation of the fan rotor 136, which propels bypass air through and out of the bypass gas path 152. The propulsion of the bypass air may account for a majority of thrust generated by the turbine engine 120, e.g., more than seventy-five percent (75%) of engine thrust. The turbine engine 120 of the present disclosure, however, is not limited to the foregoing exemplary thrust ratio.

The assembly 20 may be included in various aircraft and industrial turbine engines other than the one described above as well as in other types of rotational equipment; e.g., wind turbines, water turbines, rotary engines, etc. The assembly 20, for example, may be included in a geared turbine engine where a gear train connects one or more shafts to one or more rotors in a fan section, a compressor section and/or any other engine section. Alternatively, the assembly 20 may be included in a turbine engine configured without a gear train. The assembly 20 may be included in a geared or non-geared turbine engine configured with a single spool, with two spools (e.g., see FIG. 10), or with more than two spools. The turbine engine may be configured as a turbofan engine, a turbojet engine, a propfan engine, a pusher fan engine or any other type of turbine engine. The present invention therefore is not limited to any particular types or configurations of turbine engines or rotational equipment.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. An assembly for rotational equipment, comprising:
a seal device comprising a plurality of seal shoes, a seal base, a plurality of spring elements and a resilient biasing element;
the seal shoes arranged around an axis in an annular array;
the seal base circumscribing the annular array of the seal shoes;
each of the spring elements radially between and connecting a respective one of the seal shoes and the seal base, a first of the spring elements including a first mount, a second mount and a spring beam, the first mount connected to a first of the seal shoes, the second mount connected to the seal base, and the spring beam connecting the first mount to the second mount; and
the resilient biasing element radially between and engaged with first and second components of the seal device, the first component comprising the first mount or the second mount,
wherein the resilient biasing element comprises a coil spring.

2. The assembly of claim 1, wherein the resilient biasing element is configured to increase a stiffness of the first of the spring elements.

3. The assembly of claim 1, wherein the resilient biasing element is configured to bias a first portion of the first of the seal shoes radially away from the seal base and a second portion of the first of the seal shoes radially towards the seal base.

4. The assembly of claim 1, wherein
the first component comprises the first mount; and
the second component comprises the seal base.

5. The assembly of claim 1, wherein
the first component comprises the first mount; and
the second component comprises a mount of a second of the spring elements that is circumferentially adjacent to the first of the spring elements.

6. The assembly of claim 5, wherein
the first mount comprises an inner surface;
the mount of the second of the spring elements comprises an outer surface radially below the inner surface; and
the resilient biasing element is radially between and engages the inner surface and the outer surface.

7. The assembly of claim 5, wherein
the mount of the second of the spring elements comprises a second mount;
the second of the spring elements further includes a first mount and a spring beam;

the first mount of the second of the spring elements is connected to a second of the seal shoes;

the second mount of the second of the spring elements is connected to the seal base; and the spring beam of the second of the spring elements connects the first mount of the second of the spring elements to the second mount of the second of the spring elements.

8. The assembly of claim 1, wherein
the first component comprises the second mount; and
the second component comprises the first of the seal shoes.

9. The assembly of claim 8, wherein
the second mount comprises an inner surface;
the first of the seal shoes comprises an outer surface radially below the inner surface; and
the resilient biasing element is radially between and engages the inner surface and the outer surface.

10. The assembly of claim 8, wherein
the first of the seal shoes comprises an inner surface;
the second mount comprises an outer surface radially below the inner surface; and
the resilient biasing element is radially between and engages the inner surface and the outer surface.

11. The assembly of claim 1, wherein
the first component comprises the first mount; and
the seal device further includes a second resilient biasing element engaged with the second mount.

12. The assembly of claim 1, wherein the seal device further includes a second resilient biasing element engaged with the first component.

13. The assembly of claim 1, wherein the first of the spring elements further includes a second spring beam connecting the first mount to the second mount.

14. The assembly of claim 1, further comprising:
a ring structure axially engaged with the seal base; and
a secondary seal device mounted with the ring structure, the secondary seal device configured to substantially seal an annular gap between the ring structure and the annular array of the seal shoes.

15. The assembly of claim 1, further comprising:
a stationary structure;
a rotor structure; and
a non-contact seal assembly comprising the seal device, the seal assembly configured to substantially seal an annular gap between the stationary structure and the rotor structure;
wherein the seal shoes circumscribe and sealingly mate with the rotor structure; and
wherein the seal base is mounted to and radially within the stationary structure.

16. An assembly for rotational equipment, comprising:
a seal device comprising a plurality of seal shoes, a seal base, a plurality of spring elements and a spring;
the seal shoes arranged around an axis;
the seal base extending circumferentially around the seal shoes and the spring elements;
each of the spring elements connecting a respective one of the seal shoes to the seal base, a first of the spring elements including a first mount, a second mount and a plurality of spring beams, the first mount connected to a first of the seal shoes, the second mount connected to the seal base, and each of the spring beams connecting the first mount to the second mount; and
the spring abutted against first and second components of the seal device, the first component comprising the first mount or the second mount,
wherein the spring comprises a coil spring.

17. An assembly for rotational equipment, comprising:
a seal device comprising a plurality of seal shoes, a seal base, a plurality of spring elements and a spring;
the seal shoes arranged around an axis;
the seal base extending circumferentially around the seal shoes and the spring elements;
each of the spring elements connecting a respective one of the seal shoes to the seal base, a first of the spring elements including a first mount, a second mount and a plurality of spring beams, the first mount connected to a first of the seal shoes, the second mount connected to the seal base, and each of the spring beams connecting the first mount to the second mount; and
the spring abutted against first and second components of the seal device, and the spring configured to increase a stiffness of the first of the spring elements, wherein the first component comprises the first mount or the second mount,
wherein the spring comprises a coil spring.

* * * * *